United States Patent
Michelsen et al.

(10) Patent No.: US 9,111,019 B2
(45) Date of Patent: Aug. 18, 2015

(54) MODELING AND TESTING INTERACTIONS BETWEEN COMPONENTS OF A SOFTWARE SYSTEM

(75) Inventors: John J. Michelsen, Colleyville, TX (US); Cameron David Bromley, Hampton (AU)

(73) Assignee: Interactive TKO, Inc., Dallas, TX (US)

( * ) Notice: Subject to any disclaimer, the term of this patent is extended or adjusted under 35 U.S.C. 154(b) by 964 days.

(21) Appl. No.: 12/570,554

(22) Filed: Sep. 30, 2009

(65) Prior Publication Data

US 2015/0205709 A1 Jul. 23, 2015

Related U.S. Application Data

(60) Provisional application No. 61/101,668, filed on Sep. 30, 2008.

(51) Int. Cl.
*G06F 9/44* (2006.01)
*G06F 11/32* (2006.01)

(52) U.S. Cl.
CPC .................. *G06F 11/323* (2013.01)

(58) Field of Classification Search
USPC ....................................... 717/125
See application file for complete search history.

(56) References Cited

U.S. PATENT DOCUMENTS

| | | | |
|---|---|---|---|
| 6,587,969 B1 | 7/2003 | Weinberg et al. | |
| 6,668,371 B2 | 12/2003 | Hamilton et al. | |
| 7,310,777 B2 * | 12/2007 | Cirne | 715/763 |
| 7,392,507 B2 | 6/2008 | Kolawa et al. | |
| 7,401,141 B2 * | 7/2008 | Carusi et al. | 709/224 |
| 7,487,508 B2 * | 2/2009 | Fu et al. | 719/310 |
| 7,512,840 B2 | 3/2009 | Martin et al. | |
| 8,117,591 B1 | 2/2012 | Michelsen | |
| 8,392,884 B2 | 3/2013 | Specchio et al. | |
| 8,826,230 B1 | 9/2014 | Michelsen | |
| 2003/0046663 A1 * | 3/2003 | Rogers et al. | 717/125 |
| 2003/0163608 A1 * | 8/2003 | Tiwary et al. | 710/1 |
| 2004/0123272 A1 | 6/2004 | Bailey et al. | |
| 2004/0225919 A1 | 11/2004 | Reissman et al. | |
| 2005/0223365 A1 * | 10/2005 | Smith et al. | 717/128 |
| 2006/0048100 A1 | 3/2006 | Levy et al. | |
| 2007/0169003 A1 * | 7/2007 | Branda et al. | 717/130 |

FOREIGN PATENT DOCUMENTS

EP 869433 10/1998

OTHER PUBLICATIONS

LISA, 2.0 User's Guide, Interactive TKO, Feb. 27, 2003, pp. 1-130.
(Continued)

*Primary Examiner* — Hang Pan
(74) *Attorney, Agent, or Firm* — Patent Capital Group

(57) ABSTRACT

Various systems and methods for are disclosed. For example, a method can involve extracting information from a response. The response is generated in response to a request generated by a test module during execution of a test case. The extracted information describes characteristics of transactions within the test case. The method can then involve generating a display, based upon the extracted information. The display includes information identifying each of the components that participated in at least one of the transactions within the test case. Such a method can be performed by a computing device implementing the test module.

21 Claims, 5 Drawing Sheets

(56) References Cited

OTHER PUBLICATIONS

LISA, 2.0 Developer's Guide, Interactive TKO, Mar. 13, 2003, pp. 1-23.

OASIS, "ebXML Test Framework Draft Document—Version 0.91," Dec. 2002, The Organization for the Advancement of Structured Information Standards, 92 pages.

U.S. Appl. No. 60/642,005, filed Jan. 7, 2005 and entitled "Graphical Model for Test Case Viewing, Editing and Reporting," inventor John Joseph Michelsen.

U.S. Appl. No. 11/328,509, filed Jan. 9, 2006 and entitled "Graphical Model for Test Case Viewing, Editing and Reporting", Inventor John Joseph Michelsen.

Non-Final Office Action in U.S. Appl. No. 11/328,509 mailed on Mar. 16, 2010.

Response to Non-Final Office Action dated 03-169-2010 in U.S. Appl. No. 11/328,509, filed Sep. 16, 2010.

Final Office Action in U.S. Appl. No. 11/328,509 mailed on Nov. 24, 2010.

Request for Continued Examination and Amendment in U.S. Appl. No. 11/328,509, filed Apr. 25, 2011.

Notice of Allowance in U.S. Appl. No. 11/328,509 mailed on Oct. 21, 2011.

U.S. Appl. No. 13/341,361, filed Dec. 30, 2011 and entitled "Graphical Model for Test Case Viewing, Editing, and Reporting," inventor John Joseph Michelsen.

Non-Final Office Action in U.S. Appl. No. 13/341,361 mailed on Dec. 19, 2013.

Response to Dec. 19, 2013 Non-Final Office Action in U.S. Appl. No. 13/341,361, filed Mar. 19, 2014.

Notice of Allowance in U.S. Appl. No. 13/341,361 mailed on Apr. 25, 2014.

U.S. Appl. No. 14/470,823 entitled Graphical Model for Test Case Viewing, Editing, and Reporting, inventor John Joseph Michelsen, filed Aug. 27, 2014.

U.S. Appl. No. 14/470,897 entitled Graphical Model for Test Case Viewing, Editing, and Reporting, inventor John Joseph Michelsen, filed Aug. 27, 2014.

Non-Final Office Action in U.S. Appl. No. 14/470,823 mailed on Mar. 26, 2015.

Non-Final Office Action in U.S. Appl. No. 14/470,897 mailed on Mar. 27, 2015.

Response to Non-Final Office Action in U.S. Appl. No. 14/470,823 filed on Jun. 26, 2015.

Response to Non-Final Office Action dated Mar. 27, 2015 in U.S. Appl. No. 14/470,897 filed on Jun. 29, 2015.

\* cited by examiner

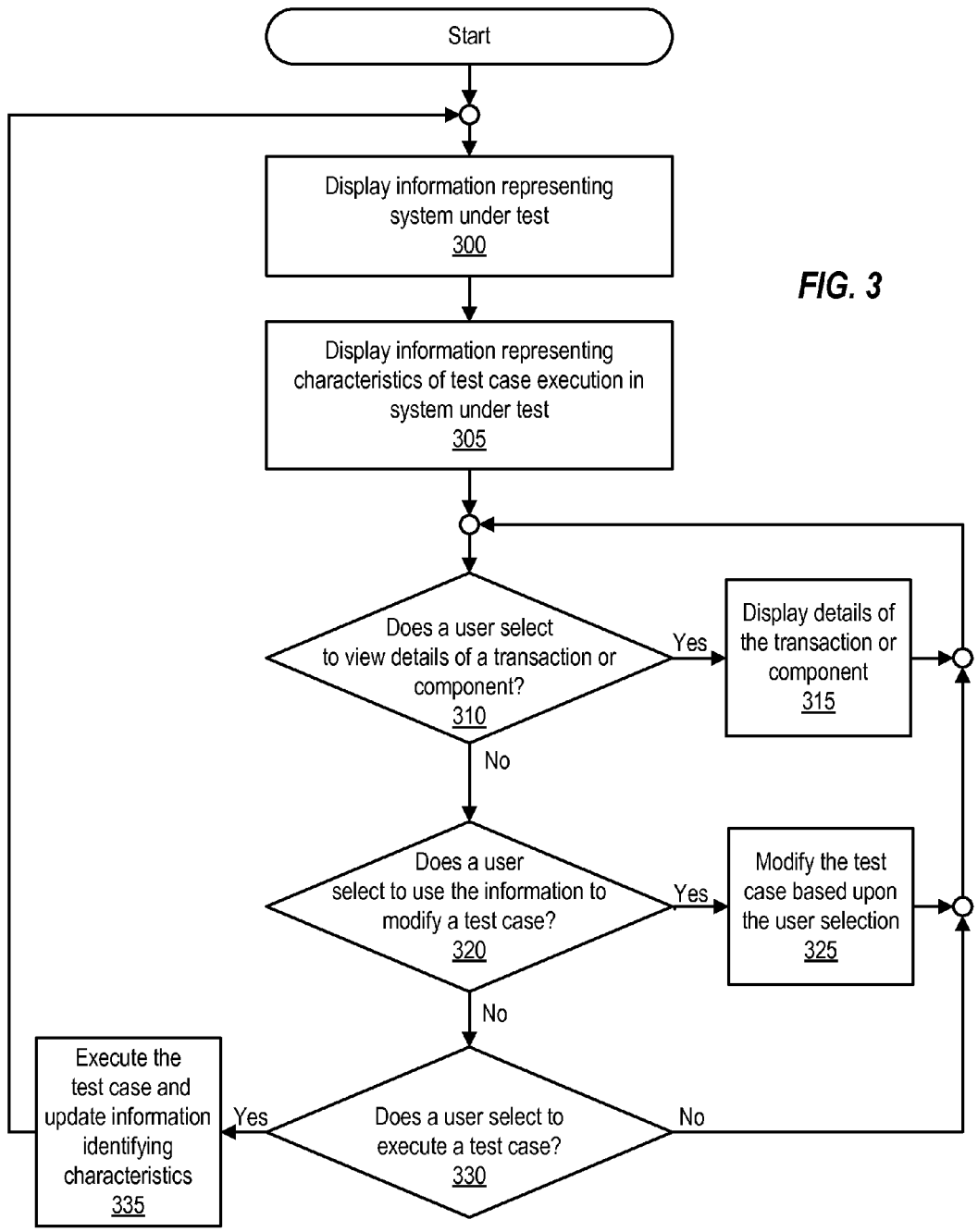

MODELING AND TESTING INTERACTIONS BETWEEN COMPONENTS OF A SOFTWARE SYSTEM

RELATED APPLICATIONS

This application claims the benefit, under 35 U.S.C. §119 (e), of U.S. Provisional Application No. 61/101,668, filed Sep. 30, 2008, entitled "Modeling and Testing Interactions between Components of a Software System," and naming Cameron David Bromley as the inventor. The above-referenced application is hereby incorporated by reference in its entirety as if completely and fully set forth herein.

FIELD OF THE INVENTION

This invention relates to software testing and, more particularly, to testing service oriented architectures and similar systems that include multiple independent components.

BACKGROUND OF THE INVENTION

In many testing scenarios, it is difficult to determine how each of several different components of a software system is affecting performance. For example, a software developer may be unable to determine whether a new application is responding too slowly due to performance problems within the application itself, network congestion affecting the application's interactions with a web server from which the application obtains necessary data, or a sluggish database that the web server interacts with. Since each of these components may be implemented independently, it is difficult to be able to test all of the components in a manner that captures the interactions between the components.

BRIEF DESCRIPTION OF THE DRAWINGS

A more complete understanding of the present invention may be acquired by referring to the following description and the accompanying drawings, in which like reference numbers indicate like features.

FIG. 3 is a flowchart of a method of generating a model of a system under test and allowing a user to interact with the system under test by interacting with the model, according to one embodiment of the present invention.

Figure 1:
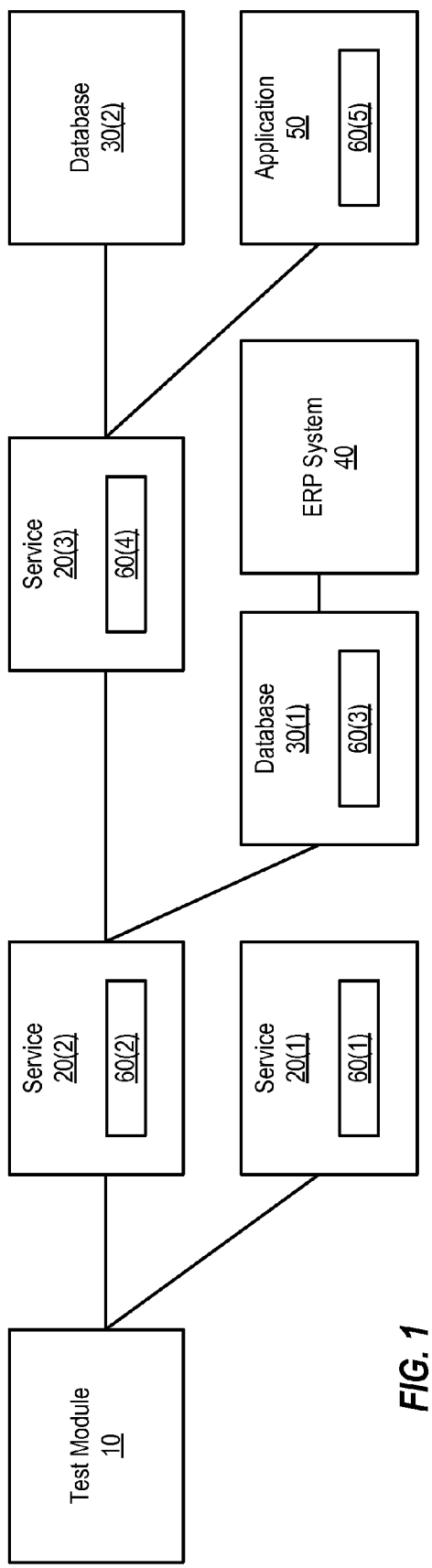
FIG. 1 is a block diagram of a test system in which a software architecture that includes multiple independent software components is being tested, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

FIG. 1 is a block diagram of a test system in which a software architecture that includes multiple independent software components is being tested. As shown, the software architecture includes a test module 10, three services 20(1), 20(2), and 20(3), two databases 30(1) and 30(2), an enterprise resource planning (ERP) system, and an application 50. All or some of these components are implemented in software that is executing on a computing device (e.g., a personal computer, server, personal digital assistant, telephone, or the like). The components shown in FIG. 1 can all be implemented on the same computing device. However, in many embodiments, at least some of these components (or portions thereof) will be implemented on different computing devices, all or some of which can be coupled via one or more networks (e.g., a local area network, storage area network, and/or wide area network such as the Internet). In this example, some of the components in the test system may already be in production (e.g., these components have already been tested and released and are now being used in a production environment), while other components may still be in development and/or testing.

Each service 20(1)-20(3) can provide any of a variety of different services and can be implemented as any one or more of a variety of software components. For example, each service 20 can be a web service (e.g., having an interface defined by a web service definition language (WSDL) file), a web site (e.g., as implemented by one or more web pages provided by a web server), or the like. Services 20(1)-20(3) can each be implemented as an object or other component (e.g., an enterprise service bus (ESB) construct, an Enterprise JavaBean (EJB), a web component such as a JavaServer Pages (JSP) page or Java servlet component, other standalone Java component, or Java applet), as an application that includes any of the previously-mentioned components, or the like.

Databases 30(1) and 30(2) can each include a database server that is configured to respond to requests to access information stored in a database. Application 50 can be any of a variety of different applications and can include any one or more of a variety of different software components. Other components that can be included in a testing system such as the one shown in FIG. 1 include a legacy application operating on a mainframe, a data service, an order manager, a transactional data store, an enterprise application integration (EAI) system, or the like.

Test module 10 is configured to execute a test case by sending requests to one or more of the components of the system under test. In this example, the test module executes a test case that calls services 20(1) and 20(2). In response, each service should return a response to test module 10. Service 20(1) generates its response independently, without needing to call any other service or component. In contrast, service 20(2)'s response is dependent upon database 30(1), which is in turn dependent upon ERP system 40, and service 20(3), which in turn depends on database 30(2) and application 50.

Several of the components of the system under test include an instrumentation module. In particular, service 20(1) includes instrumentation module 60(1), service 20(2) includes instrumentation module 60(2), service 20(3) includes instrumentation module 60(4), database 30(1) includes instrumentation module 60(3), and application 50 includes instrumentation module 60(5). Instrumentation modules 60(1)-60(5) (collectively referred to herein as instrumentation modules 60) are modules that are configured to provide visibility into the operations of each instrumented component to test module 10. In particular, each instrumentation module 60 is configured to detect requests and responses being sent to and from the component in which that instrumentation module is embedded. In response to detecting a request and/or response, the instrumentation module 60 is configured to detect one or more characteristics (e.g., a system clock value, current processor and/or memory usage, contents of the request, contents of the response to the request, identity of the requester that generated the request, identity of the responder generating the response to the request, Java virtual machine (JVM) statistics, standard query language (SQL) queries (SQLs), number of database rows returned in a response, logging information (e.g., messages logged in response to a request and/or response), error messages, simple object access protocol (SOAP) requests, values generated by the component that includes the instrumentation module but that are not returned in the response to the request, web service invocations, EJB method invocations, EJB entity lifecycle events, heap sizing, and the like) and to cause information identifying those characteristics to be provided to test module 10.

In one embodiment, test cases and/or test case results are stored in extensible markup language (XML) documents. A user can save a test case to a file for later editing, or when preparing to run the test. Test module 10 can store the information identifying the characteristics generated by instrumentation modules 60 in response to execution of a particular test case in an XML test case result document.

Some instrumentation modules 60 can be implemented by inserting a few lines of code into the software component (or the application server associated with that software component) being instrumented. Such code can be inserted into a servlet filter, SOAP filter, a web service handler, an EJB3 method call, a call to a Java Database Connectivity (JDBC) handler, and the like. For example, an instrumentation module configured to monitor an EJB can be configured as an EJB3 entity listener (e.g., to monitor entity beans) or interceptor (e.g., to monitor session beans). In one embodiment, instrumentation modules 60 can include functionality similar to that described in U.S. patent application Ser. No. 11/328,510, titled "Instrumentation System and Method for Testing Software," filed Jan. 9, 2006, and listing John J. Michelsen as an inventor, which is hereby incorporated by reference in its entirety as if completely and fully set forth herein.

In some embodiments, instrumentation modules 60 can be selectively enabled and disabled. For example, the instrumentation modules 60 can support an isEnabled( ) function will return true unless an administrator has explicitly disabled the instrumentation module (e.g., by setting a system property accessed by isEnabled( ) to a value indicating that testing is currently disabled).

Each instrumentation module 60 can also be configured to determine whether a particular request and/or response is part of a test case being executed by test module 10. For example, instrumentation modules can do this by searching requests and/or responses for special hypertext transfer protocol (HTTP) headers or SOAP headers. In some embodiments, instrumentation modules can perform this search using a hash table lookup. If the request and/or response is part of a test case, an instrumentation module 60 will then capture characteristics associated with the request and/or response and cause information identifying those characteristics to be returned to test module 10.

While instrumentation modules can be selectively enabled and/or configured to selectively capture information for test module 10 in some embodiments, other embodiments may not support one or both of these features. For example, some embodiments may support selectively enabling instrumentation modules but will not support selectively capturing and returning information (i.e., such systems will capture and return information for all requests and/or responses, whether or not those requests and/or responses are part of a test case). Similarly, some embodiments may support selective capture of information, but will not support selective enablement of instrumentation modules. Yet other embodiments may not support either feature.

Some components (or their corresponding application servers) may not provide users with the ability to modify their code, and thus some instrumentation modules can be implemented externally to the component being monitored in a manner that will cause all requests and responses being sent to and/or from that component to be handled by the instrumentation module. For example, for an existing database, an instrumentation module can be implemented as a driver. Calling components can be configured (e.g., by manipulating a driver manager) to call the instrumentation driver instead of the database's driver. The instrumentation driver can in turn call the database's driver and cause the database's driver to return responses to the instrumentation driver. For example, in one embodiment, the identity of the 'real' driver for the database can be embedded in the uniform resource locator (URL) that is passed to the instrumentation driver. In this way, the instrumentation driver can intercept all calls to the database, detect characteristics of those calls, pass the calls to the appropriate database, detect characteristics of the corresponding responses, and then embed characteristics of those calls and responses in a web service header that is returned to the component that called the database.

In one embodiment, each instrumentation module 60 causes information (referred to herein as characteristic information) identifying the detected characteristics to be returned to test module 10 by embedding that information in responses being returned as part of the test case. As described in more detail below, such characteristic information can include both information generated by the instrumentation module itself and information generated by another instrumentation module within the system. An instrumentation module can embed characteristic information into a response by encoding characteristic information into XML, compress the XML (e.g., into ZIP file format), then embedding that compressed XML into the response (e.g., by embedding the compressed XML into an HTML or SOAP header). As another example, the characteristic information can be embedded into a property that is added to a Java Messaging Service (JMS) response message (similar properties can be added to response messages in other messaging environments).

As requests and responses progress through the test system, additional characteristic information is captured and passed along by the instrumentation modules. For example, when test module 10 sends a request to service 20(2), instrumentation module 60(2) will capture characteristic information associated with that request (e.g., the time at which the request was received, the sender of that request, the time at which corresponding requests were sent to database 30(1) and/or service 20(3), and the like) and save that characteristic information for inclusion in a corresponding response generated by service 20(2) and returned to test module 10. As noted above, however, service 20(2) is dependent upon several other components, and thus service 20(2) cannot return the response until responses have been received from database 30(1) and service 20(3).

As shown, database 30(1) includes instrumentation module 60(3). This instrumentation module 60(3) can capture characteristics of the request (e.g., a database query) sent by service 20(2) to database 30(1) and encode characteristic information identifying those characteristics into the response returned from database 30(1) to service 20(2). For example, instrumentation module 60(3) can capture the exact SQL queries that were provided to database 30(1) by service 60(2), the identity of service 60(2), the time at which the request was received, and the like. Instrumentation module 60(2) can in turn extract that characteristic information from database 30(1)'s response, capture additional characteristic information associated with the response (e.g., such as the time at which the response was received), and include the extracted and the captured characteristic information along with any already-saved characteristic information in the response being sent from service 20(2) to test module 10.

Similarly, instrumentation module 60(4) can capture characteristics of a request sent from service 20(2) to service 20(3), as well as characteristics of requests sent from service 20(3) to application 50 and database 30(2). Instrumentation module 60(4) can also capture characteristics of responses returned by database 30(2) and application 50. Instrumentation module 60(4) can also extract characteristic information captured and encoded by instrumentation module 60(5) from responses sent from application 50.

Figure 4:
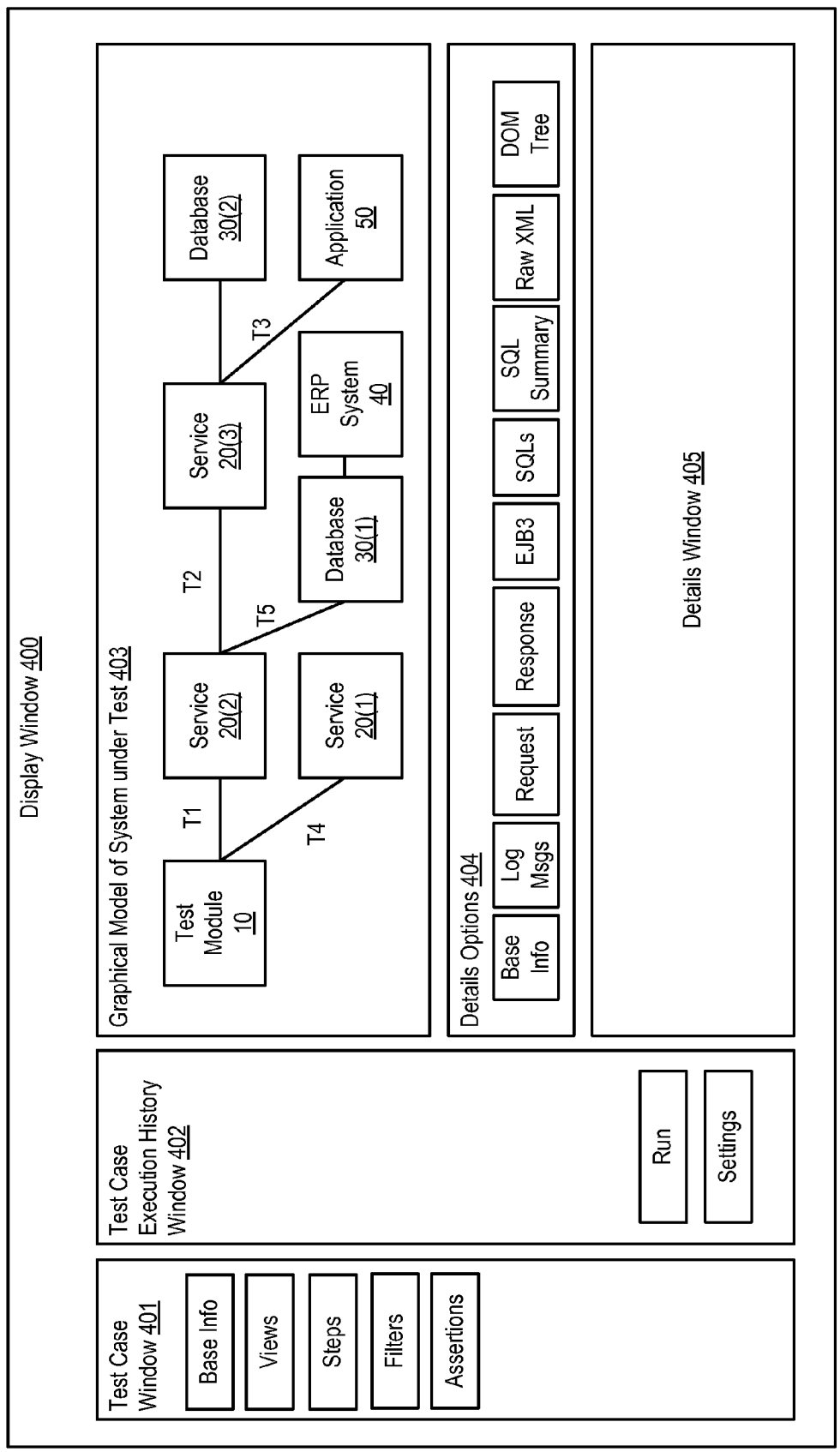
FIG. 4 is a block diagram of a display window that includes a model of a test system and allows a user to interact with the test system via the model, according to one embodiment.

Once the characteristic information is returned to test module 10, test module 10 can extract that information, process the extracted information (e.g., in order to identify which components were involved in the execution of the test case; in order to identify response times for certain system components, based upon the differences in request and response times; and the like) and then display the processed information to a user (e.g., in a display window such as that shown in FIG. 4). The displayed information can identify each component that was involved in the test case (e.g., each of the components shown in FIG. 1). The user can then manipulate the displayed information in order to see details of the testing process and/or modify a test case.

As noted above, the characteristic information captured by the instrumentation modules 60 distributed throughout the system can describe individual requests and/or responses that test module 10 (and the services 20(1) and 20(2) being called by test module 10) would otherwise not have access to. Thus, the information displayed to the user can include information describing transactions (e.g., each transaction can include a request and its corresponding response) to which test module 10 was not a party. Accordingly, even though test module 10 does not directly communicate with certain components of the test system, test module 10 can nevertheless display information representing those components and characteristics of transactions in which those components participated. Thus, a user can now view information describing which and how components interact in response to a single test case executed by a single test module, without needing to create independent test cases and/or test modules for each component.

The information displayed by test module 10 can include information identifying the response times and response data generated by each component. This can allow a user to pinpoint errors or identify where performance bottlenecks are arising.

As an example of how test module 10 and instrumentation modules 60 can be used to provide visibility into a service oriented architecture (SOA), consider a situation in which test module 10 is configured to execute a test case, which includes a web service call, every ten minutes. The web service call should result in three EJBs being called, and one of those EJBs should in turn issue several SQL statements. If the service begins to fail, a user can view the information representing the characteristics of the most recent test case execution provided by test module 10 (which in turn received the information from instrumentation modules embedded in the EJBs). This information can indicate that one of the expected SQL statements is not being issued (e.g., one of the instrumentation modules can generate characteristics information identifying which SQL statements were issued, and this information fails to identify one of the expected SQL statements). Accordingly, the user can quickly identify why the web service is failing, without having to independently test each of the EJBs called by that web service.

Figure 2A:
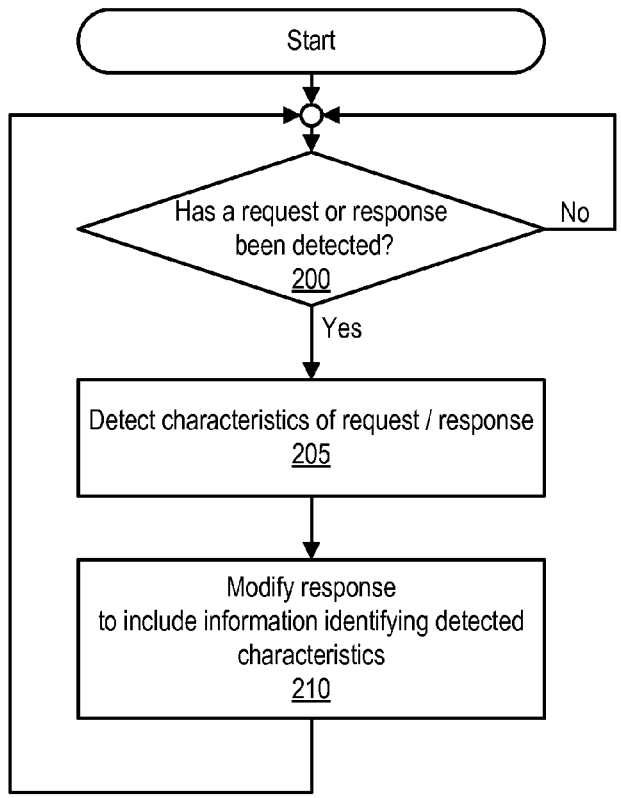
FIG. 2A is a flowchart of a method of generating information for use in modeling and testing that can be performed by an instrumentation module, according to one embodiment of the present invention.

FIG. 2A is a flowchart of a method of generating information for use in modeling and testing that can be performed by an instrumentation module (e.g., one of instrumentation modules 60 of FIG. 1). As shown, the method involves detecting a request or response, as shown at 200, detecting characteristics of that request or response, as shown at 205, and then modifying the response to that request to include characteristic information identifying the detected characteristics, as shown at 210.

Detecting a request or response can involve observing Java beans, detecting calls to a driver associated with an application being called, detecting HTTP requests, detecting messages in a queue, and the like.

Detecting characteristics can involve detecting an identity (e.g., in terms of a network address or other identifying information included in a request or response) of the component sending a request or response, detecting a system clock value or other time at which a request or response is received or sent, detecting contents of the request and/or response, detecting log and/or error messages, detecting system resource usage, detecting values generated by the component generating the request and/or response that are not actually included in the request and/or response, and the like. Detecting the characteristics can also involve detecting information that was embedded in a response by another instrumentation module.

Modifying a response to include characteristic information can involve embedding characteristic information in a header, embedding information as a property of a message, and the like. The characteristic information can be formatted in a consistent manner. For example, the characteristic information can be formatted as test properties of a testing system to which the information will ultimately be returned. Similarly, the characteristic information can be encrypted, compressed, or otherwise manipulated before being embedded.

Figure 2B:
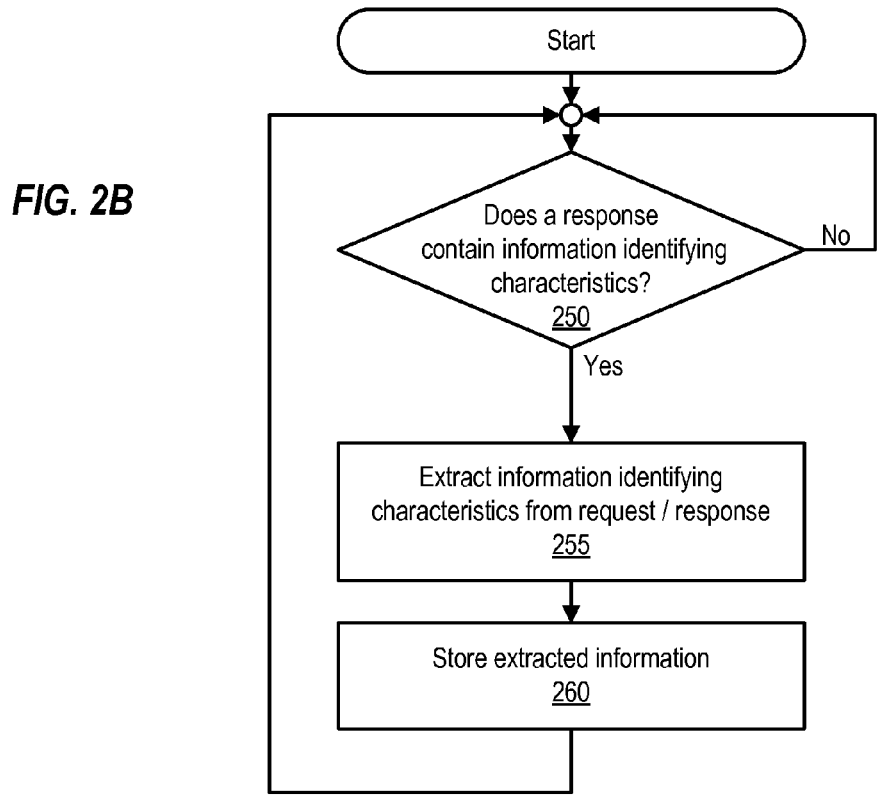
FIG. 2B is a flowchart of a method performed by a test module to obtain and save information for use in modeling and testing, according to one embodiment of the present invention.

FIG. 2B is a flowchart of a method performed by a test module (e.g., such as test module 10 of FIG. 1) to obtain and save characteristic information for use in modeling and testing. As shown, the method begins when a response containing characteristic information identifying one or more test case characteristics is received, as detected at 250. In response, the characteristic information is extracted (at 255) and stored (at 260). The characteristic information can include characteristic information generated by multiple different instrumentation modules. Extracting the characteristic information can involve extracting the characteristic information from a header or property, decrypting and/or decompressing the extracted information, and the like.

FIG. 3 is a flowchart of a method of generating a model of a system under test and allowing a user to interact with the system under test by interacting with the model. This method can be performed by a test module such as the one illustrated in FIG. 1. The method begins at 300, when the test module displays information representing the system under test to a user. This information can identify the components within the system, including components that do not directly interact with the test module. The test module can identify these components based upon characteristic information identifying which components sent and/or received various requests and/or responses during the execution of a test case, such that only those components that participated in the test case will be identified. The information identifying the participating components can be generated by instrumentation modules distributed throughout the system under test and embedded within responses returned to the test module, as described above.

The test module also displays information representing characteristics of the execution of a test case in the system under test, as shown at 305. This information can include information generated by instrumentation modules and/or information obtained by processing information generated by instrumentation modules. For example, the test module can generate a response time by calculating the difference between the time at which one component sent a request to another component and the time at which the other component returned a response to the requester.

The information displayed at 305 can also include information describing resource usage at a particular component when a particular request was received and/or when a particular response was generated, information describing the contents of a request or response, information identifying values generated by the component in response to receiving a particular request or as part of the process of generating a particular response, and the like.

The information displayed at 300 can be textual or graphical, or a combination of textual and graphical information. For example, as shown in FIG. 4, the information can include a graphical model of the system under test as well as text labels identifying various characteristics of the system under test.

The user can then manipulate the displayed information in order to view more details, modify a test case, or execute a test case. For example, the user can select one of the components identified as being part of the system under test during a particular test case in order to view more details regarding that component and its participation in the execution of the test case. In some embodiments, the test module provides functionality to graphically represent and allow user manipulation of a test case, as described in U.S. patent application Ser. No. 11/328,509, titled "Graphical Model for Test Case Viewing, Editing, and Reporting," filed Jan. 9, 2006 and listing John J. Michelsen as an inventor, which is hereby incorporated by reference in its entirety as if completely and fully set forth herein.

Thus, if a user selects to view details of a transaction or component (e.g., by clicking on or otherwise selecting a graphical or textual representation of that transaction or component from the information displayed by the test module), as detected at 310, the selected details can be displayed to the user, as indicated at 315. Selected details can include details identifying a transaction (e.g., by sequence number) or component (e.g., by name and/or network address), details of request(s) received by and/or response(s) generated by a component, details regarding the component's performance (e.g., in terms of response time), details relating the component's performance to the performance of other components (e.g., by displaying a chart or graph that indicates the percentage of the total test case execution time that was due to that component), and the like.

If the user selects to use the information to modify a test case, as detected at 320, the test case is modified based upon the user input, as shown at 325. For example, the characteristics displayed at 305 can each represent a test case property, and a user can select to add a filter or assertion to such a test case property. Filters can be used to modify certain properties. For example, a filter can be applied to a property in order to see how components that consume that property behave after that property is modified or to determine what happens if a particular property is forced to have a certain value. Assertions can be used to vary the flow of test case execution (e.g., by stopping execution of the test case) based upon a property (e.g., based upon whether the property has an expected value). Modifying a test case can involve editing an existing test case or creating a new test case.

As an example, a user can select a property representing a number of rows that were returned by a database in response to an SQL query and make an assertion based on the number of rows (e.g., to fail the test case if the number of rows is greater than a particular number). Similarly, the user can select a response time and make an assertion based upon that response time (e.g., to fail the test case if the response time exceeds 2 ms). Similarly, the user can select a particular component and make an assertion based upon whether that component is invoked during execution of the test case (e.g., to fail the test case if the component is not invoked).

If the user selects to execute a test case, as detected at 330, the test module executes the test case (this test case may have been modified at 325). Execution of a new test case can cause new characteristic information to be generated by the instrumentation modules within the system under test. Accordingly, in response to executing a test case, the test module can update its display by reperforming one or both of operations 300 and 305 with the new information provided by the instrumentation modules during execution of the test case.

While FIG. 3 shows certain operations being performed serially, it is noted that such operations can alternatively be performed in a different order or in parallel. For example, operations 310, 320, and 330 can be performed in parallel. Similarly, some operations can be omitted in certain scenarios (e.g., a user may choose to view detailed information at 315 but not to execute a test case at 335).

FIG. 4 is a block diagram of a display window that can display a model of a test system and allow a user to interact with the test system via the model. As shown, the display window 400 includes a test case window 401, test case execution history window 402, a graphical model of a system under test 403, details options 404, and details window 405. Other displays can be used instead of and/or in addition to the one shown in FIG. 4, which is merely provided as an example.

The test case window 401 provides details of the current test case (e.g., including the steps (e.g., as selected by selecting "steps"), filters (e.g., as selected by selecting "filters"), and assertions (e.g., as selected by selecting "assertions") included in the test case), as well as options to see additional details (e.g., by selecting to view base information (by selecting "info") or to select another view (by selecting "views") of the test case information).

Test case execution history window 402 can include information identifying the prior execution of the test case, including properties that resulted from the test case. Test case execution history window can also include options to run (by selecting "run") the test case again and/or to modify the settings (by selecting "settings") of the test case.

The graphical model 403 of the system under test includes information identifying each component that participated in the execution of the test case (as identified by the instrumentation modules in the system under test during execution of that test case), as well as some characteristic information, such as response times T1-T3 (which can also be derived from characteristic information generated by the instrumentation modules). In this example, each component is represented as a block and each transaction is represented as a line connecting two blocks.

Details options 404 are selectable options that allow a user to select a component and/or transaction in graphical model 403 and then see corresponding details. For example, a user can select to see basic information (by selecting "base info") identifying a component or transaction, details about log messages generated by a particular component during execution of the test case (by selecting "log msgs"), details regarding the timing and/or contents of a particular request (by selecting "request"), details regarding the timing and/or contents of a particular response (by selecting "response"), details regarding EJB3s involved in a particular transaction (by selecting "EJB3"), details regarding the SQL statements or queries made by a particular component (by selecting SQLs), a summary (e.g., by selecting "SQL summary") of the SQL activity (e.g., a summary of the number of rows returned in response to an SQL query or the like), the raw XML content included in a particular request or response (by selecting "raw XML"), or the details of a document object model (DOM) tree representing the XML content included in a particular request or response (by selecting "DOM tree"). Details window can display the details selected by user selection of one of details options 404.

Figure 5:
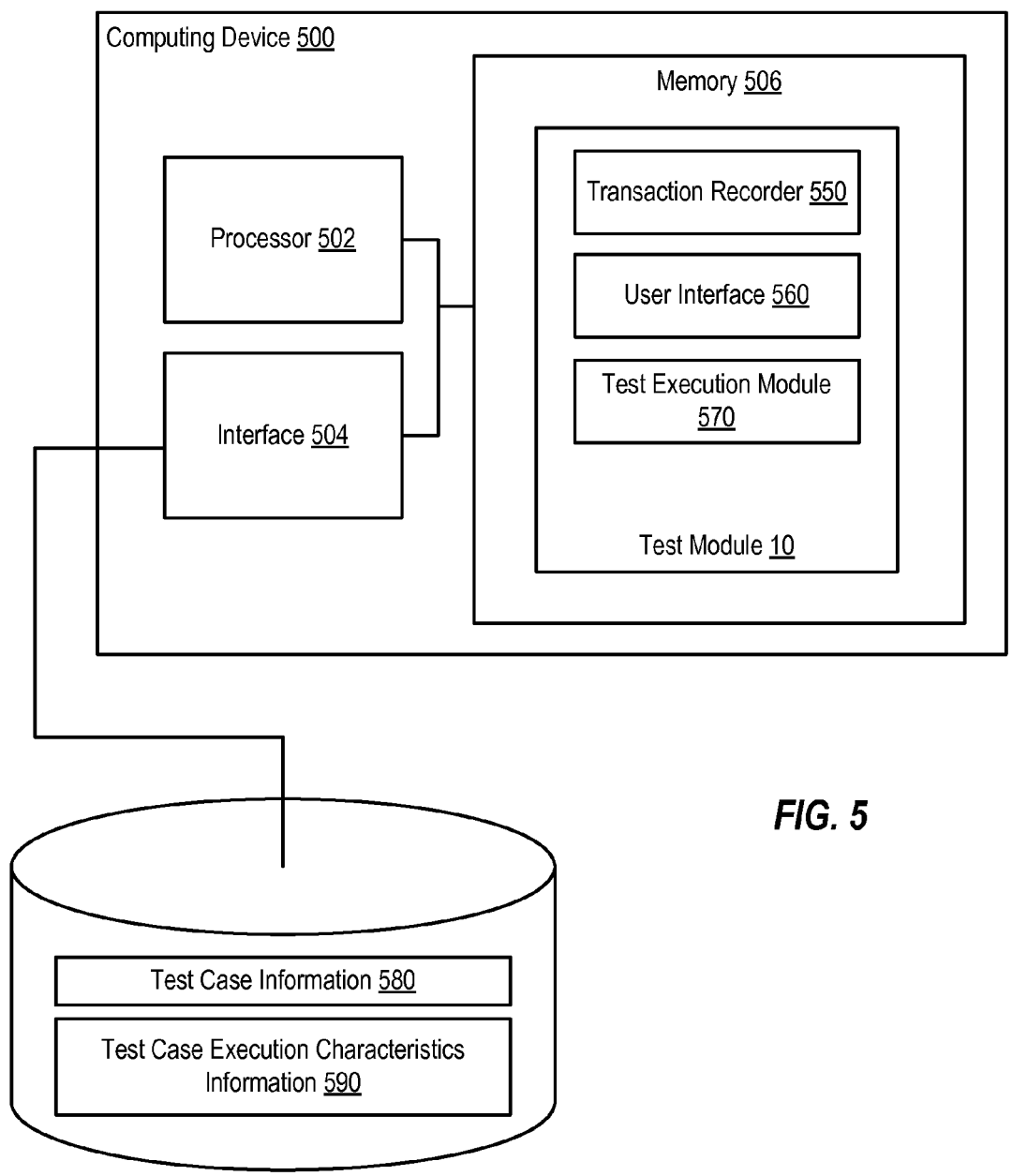
FIG. 5 is a block diagram of a test module, illustrating how such a testing module can be implemented in software, according to one embodiment of the present invention.

FIG. 5 is a block diagram of a testing module, illustrating how such a testing module can be implemented in software. As shown, a computing device 500 includes a processor 502 (e.g., a microprocessor, programmable logic device (PLD), or application specific integrated circuit (ASIC), or multiple such processors), one or more interfaces 504, and memory 506. Instructions executable by processor 502 are stored in memory 506. These instructions are executable to implement test module 10. Computing device 500 can be a personal computer, server, personal digital assistant, cell phone, laptop, workstation, or the like. Memory 506 can each include various types of computer readable storage media such as RAM (Random Access Memory), ROM (Read Only Memory), Flash memory, MEMS (Micro Electro-Mechanical Systems) memory, and the like. Processor 502, memory 506, and interface(s) 504 are coupled to send and receive data and control signals by a bus or other interconnect.

Interfaces 504 can each include an interface to a storage device on which instructions and/or data (e.g., such as data identifying a test case or a set of test case responses, including characteristic information generated by one or more instrumentation modules) are stored. Interfaces 504 can also each include an interface to a network, such as a local area network (LAN) or wide area network (WAN) such as the Internet, for use in communicating other devices and components. Such an interface can allow test module 10 to send requests to and receive responses from services and other test system components via a network. Interface 504 can also include interfaces to various peripheral Input/Output (I/O) devices, such as a monitor, on which a graphical display (e.g., allowing a user to view a model and control the testing of system under test by interacting with the model) can be displayed.

Test module 10 includes transaction recorder 550, user interface 560, and test execution module 570. Transaction recorder 550 is configured to extract characteristic information generated by instrumentation modules from responses returned to test module 10, and to store that information as, for example, test case execution characteristics information 590. Multiple sets of test case execution characteristics information 590 can be maintained (e.g., each one representing the results of a executing a particular test case at a particular time). User interface 560 is configured to access test case execution characteristics information 590 and then use that information to display at least some of the information (e.g., in the form of a graphical model like that described above) to a user, as well as to allow the user to interact with that information in order to modify a test case. If a user selects to modify a test case, user interface 560 can store the results of the modification in test case information 580, which describes one or more test cases. Test Execution Module 570 is configured to execute test cases identified by test case information 580.

Program instructions and data implementing various software components such as test module 10 can be stored on various computer readable storage media such as memory 506. In some embodiments, such program instructions can be stored on a computer readable storage medium such as a CD (Compact Disc), DVD (Digital Versatile Disc), hard disk, optical disk, tape device, floppy disk, and the like. In order to be executed by a processor, the instructions and data are loaded into memory from the other computer readable storage medium. The instructions and/or data can also be transferred to a computing device for storage in memory via a network such as the Internet or upon a carrier medium. In one embodiment, the components used implement a test module are implemented using LISA (Live Interaction Service Architecture)™, available from iTKO, Inc. of Dallas, Tex.

It is noted that the above figures illustrate specific examples. In other embodiments, different components can be used to implement the testing functionality described above. For example, while specific software components have been described as implementing specific functionality, this functionality can be implemented by different components than those depicted herein. For example, the functionality of test module 10 can be subdivided into multiple other test management components or integrated into another component. Furthermore, the specific components depicted in the figures herein can be combined or subdivided into fewer or additional components.

Additionally, other components can be used instead of and/or in addition to those shown in the figures presented herein. Such other components can provide different or additional functionality instead of and/or in addition to the functionality described herein. Furthermore, some of the functionality described herein can be eliminated in some embodiments. Although the present invention has been described in connection with several embodiments, the invention is not intended to be limited to the specific forms set forth herein.

What is claimed is:
1. A method, comprising:
   accessing test data describing characteristics of a plurality of transactions, wherein the plurality of transactions involve a plurality of components, the plurality of transactions are initiated in response to a request sent to a first one of the plurality of components during execution of a test case, the request is generated by a test module managing the test case, at least a portion of the test data is generated by a set of instrumentation agents during monitoring of one or more of the plurality of components during execution of the test case, and a portion of the test data generated by a particular one of the set of instrumentation agents monitoring a particular one of the plurality of components describes both: i) communications in a particular one of the plurality of transac- tions between the particular component and another one of the plurality of components, and ii) operations internal to the particular component during the particular transaction; and generating a display, based upon the test data, wherein:
the display comprises an interactive graphical model of a flow of the plurality of transactions,
the graphical model is to provide information identifying each of the plurality of transactions and each of the plurality of components involved in the plurality of transactions,
each of the plurality of transactions comprises a respective request and respective response to the respective request,
the graphical model represents each of the components as a respective graphical block and each of the transactions as a graphical line connecting two or more of the graphical blocks representing components that participated in the respective transaction;
interaction with the graphical lines causes information to be presented regarding the corresponding transactions, wherein the presented information comprises details of both the respective request and the respective response, and interaction with the graphical line representing the particular transaction causes information to be presented describing content of the communications;
interaction with the graphical block representing the particular components causes information to be presented describing the internal operation;
particular interactions with the graphical model are to cause changes to a definition of the test case; and
the accessing and the generating are performed by a computing device implementing the test module.

2. The method of claim 1, wherein at least one of the components does not directly receive a request from the test module during execution of the test case, and wherein the information describes a characteristic of a transaction in which the at least one of the components participated.

3. The method of claim 1, further comprising:
receiving user input manipulating the graphical model; and
updating the test case, in response to the user input.

4. The method of claim 1, wherein at least a portion of the test data is extracted, by one of the set of instrumentation agents, by extracting information from a property of a message corresponding to one or more of a plurality of transactions.

5. The method of claim 1, wherein at least part of the information is generated by an instrumentation driver, wherein the instrumentation driver is configured to: capture one or more characteristics of a request being sent to one of the components, redirect the request to another driver for the component, and capture one or more characteristics of a request generated by the one of the components.

6. The method of claim 1, wherein the display comprises information identifying a response time associated with at least one of the transactions.

7. A system, comprising:
a processor; and
a memory coupled to the processor and storing program instructions executable by the processor to implement a test module, wherein the test module is configured to:
accessing test data describing a characteristics of a plurality of transactions, wherein the plurality of transactions involve a plurality of components, the plurality of transactions are initiated in response to a request sent to a first one of the plurality of components during execution of a test case, the request is generated by a test module managing the test case, at least a portion of the test data is generated by a set of instrumentation agents during monitoring of one or more of the plurality of components during execution of the test case, and a portion of the test data generated by a particular one of the set of instrumentation agents monitoring a particular one of the plurality of components describes both: i) communications in a particular one of the plurality of transactions between the particular component and another one of the plurality of components, and ii) operations internal to the particular component during the particular transaction;
generate a display, based upon the test data, wherein:
the display comprises an interactive graphical model of a flow of the plurality of transactions,
the graphical model is to provide information identifying each of the plurality of transactions and each of the plurality of components involved in the plurality of transactions,
each of the transactions comprises a respective request and respective response to the respective request,
the graphical model represents each of the components as a respective graphical block and each of the transactions as a graphical line connecting two or more of the graphical blocks representing components that participated in the respective transaction, and
interaction with the graphical lines causes information to be presented regarding the corresponding transactions, wherein the presented information comprises details of both the respective request and the respective response, and interaction with the graphical line representing the particular transaction causes information to be presented describing content of the communications;
interaction with the graphical block representing the particular components causes information to be presented describing the internal operation; and
particular interactions with the graphical model are to cause changes to a definition of the test case.

8. The system of claim 7, wherein at least one of the components does not directly receive a request from the test module during execution of the test case, and wherein the information describes a characteristic of a transaction in which the at least one of the components participated.

9. The system of claim 7, wherein the test module is further configured to:
receive user input manipulating the graphical model; and
update the test case, in response to the user input.

10. The system of claim 7, wherein at least a portion of the test data is extracted, by one of the set of instrumentation agents, by extracting information from a header of a file or a property of a message corresponding to one or more of the plurality of transactions.

11. The system of claim 7, wherein at least part of the information is generated by an instrumentation driver, wherein the instrumentation driver is configured to: capture one or more characteristics of a request being sent to one of the components, redirect the request to another driver for the component, and capture one or more characteristics of a request generated by the one of the components.

12. The system of claim 7, wherein the display comprises information identifying a response time associated with at least one of the transactions.

13. A non-transitory computer readable storage medium storing program instructions executable to implement a test module, wherein the test module is configured to:
- access test data describing characteristics of a plurality of transactions, wherein the plurality of transactions involve a plurality of components, the plurality of transactions are initiated in response to a request sent to a first one of the plurality of components during execution of a test case, the request is generated by a test module managing the test case, at least a portion of the test data is generated by a set of instrumentation agents during monitoring of one or more of the plurality of components during execution of the test case, and a portion of the test data generated by a particular one of the set of instrumentation agents monitoring a particular one of the plurality of components describes both: i) communications in a particular one of the plurality of transactions between the particular component and another one of the plurality of components, and ii) operations internal to the particular component during the particular transaction;
- generate a display, based upon the test data, wherein:
  - the display comprises an interactive graphical model of a flow of the plurality of transactions,
  - the graphical model is to provide information identifying each of the plurality of transactions and each of the plurality of components involved in the plurality of transactions,
  - each of the transactions comprises a respective request and respective response to the respective request,
  - the graphical model represents each of the components as a respective graphical block and each of the transactions as a graphical line connecting two or more of the graphical blocks representing components that participated in the respective transaction, and
  - interaction with the graphical lines causes information to be presented regarding the corresponding transactions, wherein the presented information comprises details of both the respective request and the respective response, and interaction with the graphical line representing the particular transaction causes information to be presented describing content of the communications;
  - interaction with the graphical block representing the particular components causes information to be presented describing the internal operation; and
  - particular interactions with the graphical model are to cause changes to a definition of the test case.

14. The computer readable storage medium of claim 13, wherein at least one of the components does not directly receive a request from the test module during execution of the test case, and wherein the information describes a characteristic of a transaction in which the at least one of the components participated.

15. The computer readable storage medium of claim 13, wherein the test module is further configured to:
- receive user input manipulating the graphical model; and
- update the test case, in response to the user input.

16. The computer readable storage medium of claim 13, wherein at least a portion of the test data is extracted, by one of the set of instrumentation agents, by extracting information from a header of a file or a property of a message corresponding to one or more of the plurality of transactions.

17. The computer readable storage medium of claim 13, wherein the display comprises information identifying a response time associated with at least one of the transactions.

18. A method comprising:
- sending a request to a software system during a test of the software system;
- collecting a response of the software system to the request;
- identifying test data collected during the test of the software system by a set of instrumentation agents, wherein the test data identifies a plurality of transactions involving a plurality of components of the software system invoked based at least in part on the request, each of the transactions comprises a respective request and a respective response to the respective request, the set of instrumentation agents monitor one or more of the plurality of components, a portion of the test data generated by a particular one of the set of instrumentation agents monitoring a particular one of the plurality of components describes both: i) communications in a particular one of the plurality of transactions between the particular component and another one of the plurality of components, and ii) operations internal to the particular component during the particular transaction; and
- causing presentation of a graphical user interface (GUI) on a display device based on the test data, wherein the GUI comprises an interactive graphical model of the plurality of transactions and plurality of components, the graphical model is to provide information describing characteristics of the respective transactions and components, the graphical model represents each of the components as a respective graphical block and each of the transactions as a graphical line connecting two or more of the graphical blocks representing components that participated in the respective transaction, and interaction with the graphical lines causes information to be presented regarding the corresponding transactions, the presented information comprising details of both the respective request and the respective response,
- wherein interaction with the graphical line representing the particular transaction causes information to be presented describing content of the communications, interaction with the graphical block representing the particular component causes information to be presented describing the internal operation, and changes to a definition of the test can be made directly through interactions with the graphical model.

19. The method of claim 18, wherein the information describing execution of the particular component during the particular transaction comprises at least one of: log messages generated by the particular component and performance metrics of the execution of the particular component.

20. The method of claim 18, wherein the request comprises a simulated request of the particular software system, and the test is to identify a flow of transactions within the system as triggered by the request and performance of the particular software system during the flow of transactions.

21. The method of claim 18, wherein the presented information describes content of the respective request and response, and further describes timing of the respective request and response.

* * * * *